United States Patent
Ackermann et al.

(10) Patent No.: US 6,893,737 B2
(45) Date of Patent: May 17, 2005

(54) LOW COST ALUMINIDE PROCESS FOR MODERATE TEMPERATURE APPLICATIONS

(75) Inventors: John F. Ackermann, Laramie, WY (US); Paul V. Arszman, Cincinnati, OH (US); Andrew J. Skoog, West Chester, OH (US)

(73) Assignee: General Electric Company, Schenectady, NY (US)

(*) Notice: Subject to any disclaimer, the term of this patent is extended or adjusted under 35 U.S.C. 154(b) by 82 days.

(21) Appl. No.: 10/331,054

(22) Filed: Dec. 27, 2002

(65) Prior Publication Data

US 2004/0185295 A1 Sep. 23, 2004

(51) Int. Cl.[7] .................... B32B 15/00; B32B 15/20; B05D 3/02; B05D 1/36
(52) U.S. Cl. .................... 428/650; 428/651; 428/680; 427/376.1; 427/376.6; 427/376.8; 427/374.1; 427/383.1; 427/383.7; 427/379; 427/380; 427/404; 427/405; 427/419.1; 427/419.2
(58) Field of Search .................... 427/376.1, 376.6, 427/376.8, 379, 380, 383.1, 383.7, 404, 405, 419.1, 419.2, 374.1; 428/615, 650, 651, 680

(56) References Cited

U.S. PATENT DOCUMENTS

| | | |
|---|---|---|
| 4,451,299 A | 5/1984 | Smeggil et al. |
| 5,268,045 A | 12/1993 | Clare |
| 5,498,484 A * | 3/1996 | Duderstadt .................... 428/633 |
| 5,514,482 A | 5/1996 | Strangman |
| 5,556,713 A | 9/1996 | Leverant |
| 5,652,028 A | 7/1997 | Taylor et al. |
| 5,741,556 A | 4/1998 | Taylor et al. |
| 5,817,371 A | 10/1998 | Gupta et al. |
| 5,866,271 A | 2/1999 | Stueber et al. |
| 5,922,409 A | 7/1999 | McMordie et al. |
| 6,074,706 A | 6/2000 | Beverley et al. |
| 6,123,997 A | 9/2000 | Schaeffer et al. |
| 6,143,141 A | 11/2000 | Leverant et al. |
| 2003/0152705 A1 * | 8/2003 | Pfaendtner et al. ...... 427/376.1 |

FOREIGN PATENT DOCUMENTS

EP            1079002 A1 *    2/2001           C23C/24/08

* cited by examiner

Primary Examiner—Michael Barr
(74) Attorney, Agent, or Firm—Jonathan P. Miller; Carmen Santa Maria; McNees Wallace & Nurick LLC

(57) ABSTRACT

A low cost aluminide process for moderate temperature applications. A gas turbine engine component is cleaned and coated with a layer of metal, generally aluminum, containing paint. The metal containing paint layer is heated to a first temperature for a first period of time in an air environment to volatilize the solvents in the paint. The metal containing paint layer is heated to a second temperature for a second period of time in an oxygen-free atmosphere to volatilize the solvents in the paint. The now metal layer and component are heated to a third temperature for a third period of time to interdiffuse the metal and the metal of the component. The component and diffusion layer are then cooled to ambient temperature.

20 Claims, 2 Drawing Sheets

LOW COST ALUMINIDE PROCESS FOR MODERATE TEMPERATURE APPLICATIONS

CROSS-REFERENCE TO RELATED APPLICATIONS

This Application is related to application Ser. No. 10/330,702, filed contemporaneously with this Application on Dec. 27, 2002, entitled "LOW COST CHROME AND CHROME/ALUMINIDE PROCESS FOR MODERATE TEMPERATURE APPLICATIONS" assigned to the assignee of the present invention, and which is incorporated herein by reference.

FIELD OF THE INVENTION

The present invention is directed to a method of forming protective diffusion aluminide coatings. More particularly, this invention relates to applying a low cost diffusion aluminide coating.

BACKGROUND OF THE INVENTION

The operating temperature within a gas turbine engine is both thermally and chemically hostile. Significant advances in high temperature capabilities have been achieved through the development of iron, nickel and cobalt-based superalloys and the use of oxidation-resistant environmental coatings capable of protecting superalloys from oxidation, hot corrosion, etc.

In the compressor portion of an aircraft gas turbine engine, atmospheric air is compressed to 10–25 times atmospheric pressure, and adiabatically heated to about 800°–1250° F. (425°–675° C.) in the process. This heated and compressed air is directed into a combustor, where it is mixed with fuel. The fuel is ignited, and the combustion process heats the gases to very high temperatures, in excess of about 3000° F. (1650° C.). These hot gases pass through the turbine, where rotating turbine wheels extract energy to drive the fan and compressor of the engine. The gases then pass into the exhaust system, where the gases supply thrust to propel the aircraft. To improve the efficiency of operation of the aircraft engine, combustion temperatures have been raised. Of course, as the combustion temperatures are raised, steps must be taken to prevent thermal degradation of the materials forming the flow path for these hot gases of combustion.

An aircraft gas turbine engine has a turbine to drive its compressor. In many designs, the turbine is subdivided into a high pressure turbine (HPT) and a low pressure turbine (LPT). The HPT is located just behind the combustor in the engine layout and experiences the highest temperature and pressure levels, nominally 2400° F. (1315° C.) and 300 psia respectively, developed in the engine. The HPT also operates at very high speeds (10,000 RPM for large turbofans, 50,000 for small helicopter engines). In order to meet life requirements at these levels of temperature and pressure, the HPT today is always cooled with supplemental air cooling techniques and constructed from advanced alloys.

While a straight turbojet engine will usually have only one turbine, most engines today are of the turbofan, either of the high bypass or low bypass type, or turboprop type and require one or two additional LPT turbines to drive a fan or a gearbox. Since substantial pressure drop occurs across the HPT as the HPT extracts energy from the hot fluid stream, the LPT operates with a much less energetic fluid and will usually require several stages (usually up to six) to extract additional energy from the stream.

Components formed from iron, nickel and cobalt-based superalloys cannot withstand long service exposures if located in certain sections of a gas turbine engine, where temperature is elevated, such as the LPT and HPT sections. A common solution is to provide such components with an environmental coating that inhibits high temperature oxidation and hot corrosion. Coating materials that have found wide use for this superalloy generally include diffusion aluminide coatings. These coatings are generally formed by such methods as diffusing into a substrate matrix aluminum deposited by chemical vapor deposition (CVD) or slurry coating, or by a diffusion process such as pack cementation, above-pack, or vapor (gas) phase aluminide (VPA) deposition. In the high-pressure stages, aluminum-containing coatings are employed that form stable alumina film. In the low-pressure stages, chromium-containing coatings are favored.

Component surfaces may also include metallic heat rejection coatings, such as platinum. These heat rejection coatings assist in reducing component temperature by effectively reflecting the radiative energy away from the component surface. Accordingly, it is highly desirable to apply these heat rejection coatings to similarly exposed surfaces. However, this is not possible for certain metal alloy parts, such as HPT and LPT components, which may be regularly exposed to temperatures exceeding about 1450° F. (788° C.). In this temperature range, the heat rejection coating interdiffuses with the underlying metallic component surface, or substrate, which is also a metal. In essence, a portion of the heat rejection coating material migrates into the component substrate material as elements of the substrate migrate in the opposite direction through the heat rejection coating forming oxides on its surface. This interdiffusion causes the reflective heat rejection surface to become a radiation absorber, losing its ability to reflect radiative energy, resulting in a reduction of its ability to decrease component surface temperature, thereby decreasing the service life of the component.

A diffusion aluminide coating generally has two distinct zones, the outermost of which is an additive layer containing an environmentally resistant intermetallic generally represented by MAl, where M is iron, nickel, or cobalt, depending on the substrate material. Beneath the additive layer is a diffusion zone comprising various intermetallic and metastable phases that form during the coating reaction as a result of diffusional gradient and changes in elemental solubility in the local regions of the substrate. During high temperature exposure in air, the additive layer forms a protective aluminum oxide (alumina) scale or layer that further inhibits oxidation of the underlying substrate. The oxide layer formed over the diffusion aluminide provides a diffusion barrier that inhibits interdiffusion of the heat rejection coating with the substrate.

The prior art solutions for applying diffusion aluminide coatings including VPA and CVD are complicated, have environmental drawbacks, and are inherently costly. What is needed is a less costly approach to applying diffusion aluminide coatings that is more environmentally friendly. These diffusion aluminide coatings may be used as a low-cost oxidation protection barriers and diffusion barrier to prevent interdiffusion of heat rejection coatings.

SUMMARY OF THE INVENTION

The present invention is a process for applying a diffusion aluminide coating as a corrosion or diffusion barrier coating to a superalloy substrate for use in moderately high temperature applications, such as the superalloy components found in the LPT section of a gas turbine engine. The method includes, after cleaning and masking the surface, as required, first applying an aluminum-based layer of paint to the substrate. The layer is allowed to dry.

In addition to aluminum, this paint includes a carrier material, typically an evaporable solvent, and a binder, both of which are typically organic. Next, the layer is heated to a first preselected temperature for a first preselected period of time to volatilize and remove any remaining carrier material. The layer is then heated to a second preselected temperature, usually higher than the first preselected temperature, for a second preselected period of time to burn off and volatilize the binder portion of the aluminum layer. Depending on the composition of the carrier material and the binder, the first preselected temperature may be the same as the second preselected temperature so that the solvent and binder can be removed in a single step. Next, the layer is heated to a third predetermined temperature above the second preselected temperature for a third predetermined period of time in the substantial absence of oxygen to diffuse the aluminum into the substrate, which creates a protective aluminide coating on the substrate that serves as a diffusion barrier between the substrate and subsequently applied coatings such as reflective coatings.

An advantage of the present invention is a significant labor, capital and materials cost reduction. Masking of machined surfaces with aluminum oxide powder or other complex masking is no longer required due to the ability to mask the substrate with simple masking such as paper, tape, and other suitable materials. Additionally, expensive high vacuum or high corrosion environment reactors are not required for preparation of the aluminide.

Another advantage of the present invention is that the process is more environmentally friendly than current practice since metal chloride and aluminum chromium powder waste is reduced.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
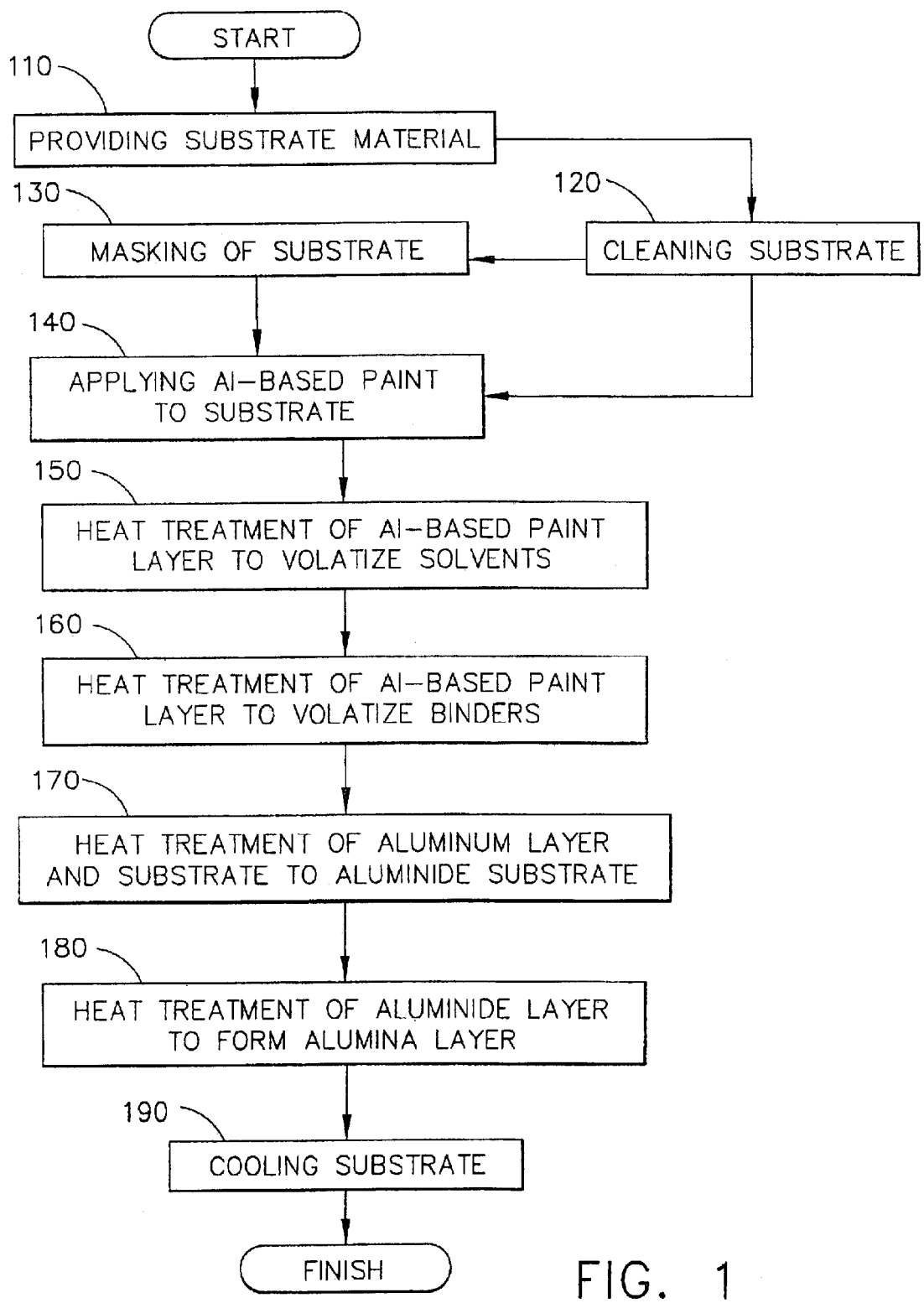
FIG. 1 is a process flow chart illustrating the application of diffusion aluminide coating of the present invention.

Referring now to FIG. 1 there is shown the method of the present invention for applying an aluminide coating to an aircraft engine component substrate, at least a portion of which comprises a metallic substrate material. The initial step of the process 110 is the provision of a substrate. After cleaning the substrate of foreign materials such as dirt, oil or undesirable oxides that would interfere with adhesion of subsequently applied coatings, as set forth as step 120, the optional next step 120 of the process is masking any preselected portions of the substrate that would be adversely affected by the application of an aluminide coating of the present invention. Any conventional masking method used for masking a surface for painting may be used. The cheapest effective method is preferred, such as masking tape. The tape utilized should not employ an adhesive that includes any residues that will detrimentally affect the surface of the substrate or that cannot be readily cleaned. The next step of the process is the application of a layer of an aluminum based paint to the substrate 140 in a manner substantially similar to that employed to apply a coat of paint to an article sufficient to encapsulate the article In a preferred embodiment, the paint is sprayed onto the surface of the substrate to a thickness sufficient to form a substantially continuous layer of aluminum on the surface of the substrate. This may require application of a plurality of layers or coats of the paint. The paint layer is of a preselected thickness in the range of about 0.001 inches to about 0.020 inches. In a preferred embodiment, the thickness of the paint layer is about 0.008 inches. While the paint may be applied as a single coat, additional coats may be applied to achieve a desired thickness. Such paint generally contains organic solvents as carriers and binders for adherence in addition to the aluminum. In a preferred embodiment, the paint is KRYLON® No. 1402 spray paint, a proprietary spray paint manufactured by Sherwin-Williams Company of Cleveland, Ohio, although comparable paints from other manufacturers could also be used. Custom made paint could also be used, provided that the metal component in the paint was about 100% aluminum. The aluminum particles in the layer of paint preferably have a platelike morphology that will be substantially oriented parallel to the surface of the substrate. More preferably, the aluminum particles are about 0.5 microns in thickness and are substantially equally distributed within the layer of paint. These particles preferably have an aspect ratio of between about 100:1 to about 10:1, with the most preferred embodiment being about 20:1. However, the size and morphology of the aluminum particles will be dictated by the nozzle opening of the spray paint can. This nozzle opening can be modified when particles at the upper end of the preferred range are required.

After the paint has dried, which usually entails evaporation of a substantial portion of the solvent, the next step of the process is a baking step in which the paint layer is heated in an air atmosphere to a first preselected temperature for a first preselected period of time to volatilize remaining solvents in paint layer 150. The first preselected temperature is generally in the range of about 300° F. (150° C.) to about 485° F. (250° C.), and the first preselected time is in the range of about one hour to about three hours depending on the first preselected temperature, with shorter times required for more elevated temperatures. In a preferred embodiment, the first preselected temperature is about 400° F. (200° C.) and the first preselected time is about two hours.

The next step of the process is a second heat treatment step in which the paint layer is heated in an inert atmosphere in the absence of oxygen to a second preselected temperature for a second preselected period of time to burn off and volatilize the remaining binders in the paint layer 140, which leaves the substrate coated with a continuous layer that is now almost entirely aluminum. The second preselected temperature is generally in the range of about 570° F. (30° C.) to about 930° F. (500° C.), and the second preselected time is in the range about one hour to about three hours depending on the second preselected temperature. Again, shorter times are used with higher temperatures. In a preferred embodiment the second preselected temperature is about 750° F. (400° C.) and the second preselected time is about two hours.

The next step of the process is a third heat treatment in which the aluminum layer and substrate are heated in a hydrogen reducing or vacuum furnace to a third preselected temperature for a third preselected period of time in a protective atmosphere in the absence of oxygen such as a reducing atmosphere or an inert gas atmosphere to interdiffuse the aluminum and the substrate 170. The protective atmosphere is required to prevent the premature oxidation of aluminum that will inhibit its ability to diffuse into the substrate. During the third heat treatment, the third preselected temperature reached and maintained for the duration of the third heat treatment may range from about 1100° F. (600° C.) to about 1830° F. (1,000° C.). One having skill in the art realizes that the duration of the third heat treatment also varies depending upon the temperature selected, since the rate of diffusion of aluminum and substrate elements is exponentially affected by temperature, for example, the aluminum layer and substrate will typically require about fifty hours of exposure at about 1,100° F. (600° C.), or about one hour of exposure at about 2,000° F. (1,100° C.) to achieve substantially the same results, i.e., same depth of diffusion about 0.001 to about 0.005 inches. Therefore, any number of heat/exposure combinations may be employed as a matter of manufacturing convenience, so long as the results achieved substantially mirror the results of the 1,100° F./2000° F. (600° C./1,100° C.) exposures just described. In a preferred embodiment, the third preselected temperature is about 1,800° F. (980° C.) and the third preselected time is about 2 hours. Once this third heat treatment has been completed a significant amount of aluminum is diffused into substrate, forming a diffusion aluminide layer. Such aluminum diffusion into a metal substrate is well known in the art. However, unlike some prior art processes in which application of aluminum is performed at elevated temperatures so that uncontrolled diffusion occurs even as the elemental aluminum is applied, the present invention requires a separate heat treatment step to accomplish controlled diffusion.

The next step 180 of the process is a fourth heat treatment step in which an alumina coating is formed on the surface of the diffusion aluminide layer. Generally, the heat treatment can be performed in a separate furnace, but in certain applications the heat treatment can be performed after installation in the operating turbine if the operating temperatures in the turbine are within the desired range. The diffusion aluminide layer is heated in an air atmosphere for at a fourth preselected temperature for a fourth preselected period of time to form an alumina layer on the surface of the diffusion aluminide coating. The fourth preselected temperature is generally in the range of about 1,200° F. (650° C.) to about 1,800° F. (980° C.), and the fourth preselected time is in the range about two hours to about four hours depending on the first preselected temperature, with shorter times required for more elevated temperatures. In a preferred embodiment, the fourth preselected temperature is about 1380° F. (750° C.) and the fourth preselected time is about two hours. Such alumina formation on the surface of a diffusion aluminide coating is well-known in the art. The substrate is then cooled to ambient temperature 190.

Figure 2:
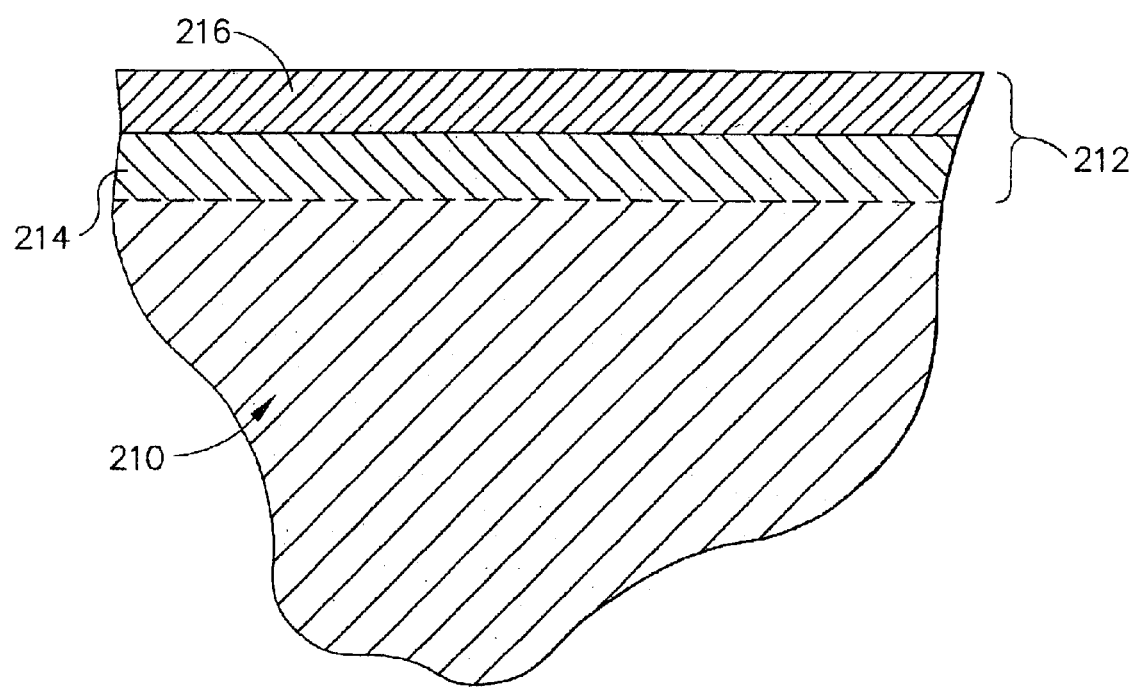
FIG. 2 is a cross-sectional view of a substrate with a diffusion aluminide coating applied with the method of the present invention.

FIG. 2 represents a diffusion aluminide coating 212 that can be produced by the method of this invention. The coating 212 is shown as overlying a substrate 210, which is typically the base material of the component protected by the coating 212. Typical material for the substrate 210 (and therefore the component) include a superalloy selected from the group consisting of iron, cobalt, nickel and combinations thereof, though other alloys could used. The aluminum coating 212 is generally characterized by an additive layer 216 that overlies a diffusion zone 214, the former of which contains an oxidation-resistant MAl intermetallic phase, such as the nickel-aluminum beta phase (NiAl), where M are elements that rapidly diffuse from the substrate through the aluminum and depends upon the substrate composition. The additive layer 216 may also contain other intermetallic phases, depending on whether other metals were deposited or otherwise present on the substrate 210 prior to aluminizing. For example, the additive layer 216 may include $PtAl_2$ or platinum in solution in the MAl layer if platinum was first plated on the substrate 210. Such diffusion aluminide coatings form an aluminum oxide scale (not shown) on their surface during exposure to engine environments. The oxide scale inhibits oxidation of the aluminide coating 212 and substrate 210, while providing good corrosion resistance and the aluminide layer provides a reservoir of aluminum to heal any fissures in the oxide scale. A suitable thickness for the coating 212 is typically about 25 to 225 micrometers (about 0.001 to 0.010 inch). A reflective coating (not shown), such as platinum may be deposited over the aluminide coating. A TBC may also be applied over the aluminide coating.

The coating created by the present invention also forms a diffusion barrier to protect subsequently applied coatings such as platinum reflective coatings. This means that the aluminide coatings created by the present invention prevent the reflective coatings from interdiffusing with the substrate material. For example, if a platinum layer is applied to the surface of the aluminide layer created by the present invention, the platinum will not diffuse through alumina formed over the aluminide coating when the coated substrate is exposed to a high temperature environment.

The integrity of a coating is performed by corrosion testing. Testing of a coupon, typically lengths of material approximately one inch in diameter, aluminided by the method of the present invention have been conducted using corrosion testing. For the present invention, a coupon of HS188 alloy was cleaned and coated with a single coat of KRYLON® No. 1402 paint and allowed to dry. The coupon was heated to about 390° F. (200° C.) and held at that temperature for a period of about two hours to volatilize the solvents in the paint layer. The coupon was then heated to about 750° F. (400° C.) and held at that temperature for a period of about two hours to burn off and volatilize the binders in the paint layer. The coupon was then placed in a hydrogen reducing furnace in a hydrogen atmosphere and heated to a temperature of about 1880° F. (1025° C.) in order to diffuse the aluminum in the paint layer into the coupon, creating an aluminide layer on the surface of the coupon. The coupon was then cooled to ambient temperature in the furnace. Once the coupon was at room temperature, one-half of the aluminide layer was ground off of the coupon. The coupon was then placed into a furnace in an air atmosphere at a temperature of about 1830° F. (1000° C.) for about two hours to test for alloy diffusion and oxidation. The coupon was then removed from the furnace and visually inspected. The portion of the coupon where the aluminide layer had been removed showed both significant oxidation and corrosion. The portion of the coupon where the aluminide layer was still present appeared to have no change after the exposure to the hot atmosphere.

While the present invention has been described as a method for applying an aluminide coating to a metal substrate generally, the present invention can be applied to any moderate temperature jet aircraft engine component surface, such as component surfaces in the LPT portion of the engine along the gas flow path of the engine. In this context, a moderate temperature jet aircraft component surface means any component surface that normally encounters temperatures in the range of about 800° F. to 1400° F. (450° C. to 800° C.). For example, aluminide process of the present invention can be applied to the LPT engine components, such as turbine blades and turbine nozzles.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a diffusion aluminide coating to a metal substrate comprising the steps of:
   providing a metal substrate;
   cleaning the substrate of foreign material;
   coating the metal substrate with a layer of aluminum containing paint, said paint comprising substantially aluminum, solvents, and binders;
   drying the substrate;
   baking the layer of aluminum containing paint to a first temperature for a first period of time sufficient to volatilize solvents remaining in the layer of aluminum-based paint;
   baking the layer of aluminum containing paint to a second temperature for a second preselected period of time sufficient to remove the binders in the layer of aluminum containing paint in an inert atmosphere, the remaining layer comprising substantially aluminum of sufficient thickness;
   heating the metal substrate having a substantially continuous layer of aluminum to a third temperature for a third period of time sufficient to diffuse the aluminum into the substrate to form a diffusion aluminide layer;
   heating the diffusion aluminide layer to a fourth temperature for a fourth period of time to form a continuous, adherent alumina scale over the diffusion aluminide coating; and
   cooling the substrate.

2. The method of claim 1 further comprising the step of applying an outer coating over the diffusion metal layer after cooling the substrate, the alumina scale forming a diffusion barrier between the applied outer layer and the substrate underlying the alumina scale.

3. The method of claim 1 wherein the paint contains aluminum particles about 0.5 microns in thickness.

4. The method of claim 3 wherein the aluminum particles have an aspect ratio in the range of about 100:1 to about 10:1.

5. The method of claim 4 wherein the aluminum particles have an aspect ratio of about 20:1.

6. The method of claim 2 wherein the paint contains aluminum particles about 0.5 microns in thickness.

7. The method of claim 6 wherein the aluminum particles have an aspect ratio in the range of about 100:1 to about 10:1.

8. The method of claim wherein the aluminum particles have an aspect ratio of about 20:1.

9. The method of claim 1 wherein the first temperature is in the range of about 300° F. to about 485° F., the first time is in the range of about one hour to about three hours, the second temperature is in the range of about 750° F. to about 930° F., the second time is in the range of about one hour to about three hours, the third temperature is in the range of about 1100° F. to about 2000° F., the third time is in the range of about one hour to about fifty hours, the fourth temperature is in the range of about 1200° F. to about 1800° F. and the fourth temperature is in the range of about two hours to about four hours.

10. The method of claim 1 wherein the first temperature is about 400° F., the first time is about two hours, the second temperature is about 750° F. and the second time is about two hours, the third temperature is about 1800° F., the third time is about 2 hours, the fourth temperature is about 1380° F. and the fourth time is about three hours.

11. The method of claim 2 wherein the first temperature is in the range of about 300° F. to about 485° F., the first time is in the range of about one hour to about three hours, the second temperature is in the range of about 750° F. to about 930° F., the second time is in the range of about one hour to about three hours, the third temperature is in the range of about 1100° F. to about 2000° F., the third time is in the range of about one hour to about fifty hours, the fourth temperature is in the range of about 1200° F. to about 1800° F. and the fourth temperature is in the range of about two hours to about four hours.

12. The method of claim 2 wherein the first temperature is about 400° F., the first time is about two hours, the second temperature is about 750° F. and the second time is about two hours, the third temperature is about 1800° F., the third time is about 2 hours, the fourth temperature is about 1380° F. and the fourth time is about three hours.

13. The method of claim 3 wherein the first temperature is in the range of about 300° F. to about 485° F., the first time is in the range of about one hour to about three hours, the second temperature is in the range of about 750° F. to about 930° F., the second time is in the range of about one hour to about three hours, the third temperature is in the range of about 1100° F. to about 2000° F., the third time is in the range of about one hour to about fifty hours, the fourth temperature is in the range of about 1200° F. to about 1800° F. and the fourth temperature is in the range of about two hours to about four hours.

14. The method of claim 3 wherein the first temperature is about 400° F., the first time is about two hours, the second temperature is about 750° F. and the second time is about two hours, the third temperature is about 1800° F., the third time is about 2 hours, the fourth temperature is about 1380° F. and the fourth time is about three hours.

15. The method of claim 4 wherein the first temperature is in the range of about 300° F. to about 485° F., the first time is in the range of about one hour to about three hours, the second temperature is in the range of about 750° F. to about 930° F., the second time is in the range of about one hour to about three hours, the third temperature is in the range of about 1100° F. to about 2000° F., the third time is in the range of about one hour to about fifty hours, the fourth temperature is in the range of about 1200° F. to about 1800° F. and the fourth temperature is in the range of about two hours to about four hours.

16. A gas turbine nozzle coated with a diffusion barrier coating the coating formed by the method comprising:
   providing a metal substrate;
   cleaning the substrate of foreign material;
   coating the metal substrate with a layer of aluminum containing paint, said paint comprising substantially aluminum, solvents, and binders;

drying the substrate;
baking the layer of aluminum containing paint to a first temperature for a first period of time sufficient to volatilize solvents remaining in the layer of aluminum-based paint;
baking the layer of aluminum containing paint to a second temperature for a second preselected period of time sufficient to remove the binders in the layer of aluminum containing paint in an inert atmosphere, the remaining layer comprising substantially aluminum of sufficient thickness;
heating the metal substrate having a substantially continuous layer of aluminum to a third temperature for a third period of time sufficient to diffuse the aluminum into the substrate to form a diffusion aluminide layer;
heating the diffusion aluminide layer to a fourth temperature for a fourth period of time to form a continuous, adherent alumina scale over the diffusion aluminide coating; and
cooling the substrate.

17. A gas turbine nozzle coated with a diffusion barrier coating, the coating formed by the method comprising:
providing a metal substrate;
cleaning the substrate of foreign material;
coating the metal substrate with a layer of aluminum containing paint, said paint comprising substantially aluminum, solvents, and binders;
drying the substrate;
baking the layer of aluminum containing paint to a first temperature for a first period of time sufficient to volatilize solvents remaining in the layer of aluminum-based paint;
baking the layer of aluminum containing paint to a second temperature for a second preselected period of time sufficient to remove the binders in the layer of aluminum containing paint in an inert atmosphere, the remaining layer comprising substantially aluminum of sufficient thickness;
heating the metal substrate having a substantially continuous layer of aluminum to a third temperature for a third period of time sufficient to diffuse the aluminum into the substrate to form a diffusion aluminide layer;
heating the diffusion aluminide layer to a fourth temperature for a fourth period of time to form a continuous, adherent alumina scale over the diffusion aluminide coating;
cooling the substrate; and
applying an outer coating over the diffusion metal layer after cooling the substrate, the alumina scale forming a diffusion barrier between the applied outer layer and the substrate underlying the alumina scale.

18. A gas turbine nozzle coated with a diffusion barrier coating, the coating formed by the method comprising:
providing a metal substrate;
cleaning the substrate of foreign material;
coating the metal substrate with a layer of aluminum containing paint, said paint comprising substantially aluminum, solvents, and binders;
drying the substrate;
baking the layer of aluminum containing paint to a temperature in the range of about 300° F. to about 485° F. for a time in the range of about one hour to about three hours to volatilize solvents remaining in the layer of aluminum-based paint;
baking the layer of aluminum containing paint to a temperature in the range of about 750° F. to about 930° F. for a period of time in the range of about one hour to about three hours to remove the binders in the layer of aluminum containing paint in an inert atmosphere, the remaining layer comprising substantially aluminum of sufficient thickness;
heating the metal substrate having a substantially continuous layer of aluminum to a temperature in the range of about 1100° F. to about 2000° F. for a period of time in the range of about one hour to about fifty hours to diffuse the aluminum into the substrate to form a diffusion aluminide layer;
heating the diffusion aluminide layer to a temperature in the range of about 1200° F. to about 1800° F. for a period of time in the range of about two hours to about four hours to form a continuous, adherent alumina scale over the diffusion aluminide coating; and
cooling the substrate.

19. A gas turbine nozzle coating with a diffusion barrier coating, the coating formed by the method comprising:
A gas turbine nozzle coated with a diffusion barrier coating, the coating formed by the method comprising:
providing a metal substrate;
cleaning the substrate of foreign material; coating the metal substrate with a layer of aluminum containing paint, said paint comprising substantially aluminum, solvents, and binders;
drying the substrate;
baking the layer of aluminum containing paint to a temperature in the range of about 300° F. to about 485° F. for a time in the range of about one hour to about three hours to volatilize solvents remaining in the layer of aluminum-based paint;
baking the layer of aluminum containing paint to a temperature in the range of about 750° F. to about 930° F. for a period of time in the range of about one hour to about three hours to remove the binders in the layer of aluminum containing paint in an inert atmosphere, the remaining layer comprising substantially aluminum of sufficient thickness;
heating the metal substrate having a substantially continuous layer of aluminum to a temperature in the range of about 1100° F. to about 2000° F. for a period of time in the range of about one hour to about fifty hours to diffuse the aluminum into the substrate to form a diffusion aluminide layer;
heating the diffusion aluminide layer to a temperature in the range of about 1200° F. to about 1800° F. for a period of time in the range of about two hours to about four hours to form a continuous, adherent alumina scale over the diffusion aluminide coating;
cooling the substrate; and
applying an outer coating over the diffusion metal layer after cooling the substrate, the alumina scale forming a diffusion barrier between the applied outer layer and the substrate underlying the alumina scale.

20. A gas turbine nozzle coating with a diffusion barrier coating, the coating formed by the method comprising:
providing a metal substrate;
cleaning the substrate of foreign material;
coating the metal substrate with a layer of aluminum containing paint, said paint comprising substantially aluminum particles about 0.5 microns in thickness, solvents, and binders;

drying the substrate;

baking the layer of aluminum containing paint to a temperature in the range of about 300° F. to about 485° F. for a time in the range of about one hour to about three hours to volatilize solvents remaining in the layer of aluminum-based paint;

baking the layer of aluminum containing paint to a temperature in the range of about 750° F. to about 930° F. for a period of time in the range of about one hour to about three hours to remove the binders in the layer of aluminum containing paint in an inert atmosphere, the remaining layer comprising substantially aluminum of sufficient thickness;

heating the metal substrate having a substantially continuous layer of aluminum to a temperature in the range of about 1100° F. to about 2000° F. for a period of time in the range of about one hour to about fifty hours to diffuse the aluminum into the substrate to form a diffusion aluminide layer;

heating the diffusion aluminide layer to a temperature in the range of about 1200° F. to about 1800° F. for a period of time in the range of about two hours to about four hours to form a continuous, adherent alumina scale over the diffusion aluminide coating; and cooling the substrate.

* * * * *

UNITED STATES PATENT AND TRADEMARK OFFICE
CERTIFICATE OF CORRECTION

PATENT NO.    : 6,893,737 B2
DATED         : May 17, 2005
INVENTOR(S)   : Ackermann et al.

It is certified that error appears in the above-identified patent and that said Letters Patent is hereby corrected as shown below:

Column 7,
Line 63, "claim wherein" should be -- claim 7 wherein --.

Column 8,
Line 61, "coating the" should be -- coating, the --.

Signed and Sealed this

Twenty-first Day of February, 2006

JON W. DUDAS
*Director of the United States Patent and Trademark Office*